United States Patent [19]

Austin

[11] Patent Number: 5,372,393
[45] Date of Patent: Dec. 13, 1994

[54] CAPTURE RING FITTING

[75] Inventor: John S. Austin, Atlantic Beach, Fla.

[73] Assignee: Resistoflex Division of Unidynamics Corporation, Stamford, Conn.

[21] Appl. No.: 930,154

[22] Filed: Aug. 14, 1992

[51] Int. Cl.⁵ ............................................. F16L 49/00
[52] U.S. Cl. ..................................... 285/354; 285/23; 285/917; 29/525
[58] Field of Search ......................... 285/23, 354, 917; 29/525

[56] References Cited

U.S. PATENT DOCUMENTS

| | | | |
|---|---|---|---|
| 1,788,750 | 1/1931 | Snyder | 411/337 |
| 2,417,350 | 3/1947 | Conroy | 285/386 |
| 2,460,110 | 1/1949 | Stinchcomb et al. | 285/386 |
| 2,839,595 | 6/1958 | Felts | 285/350 |
| 2,958,545 | 11/1960 | Stelzer | 285/354 |
| 3,200,690 | 8/1965 | Dickman | 411/337 |
| 3,201,148 | 8/1965 | Shurtleff | 285/354 |
| 3,572,775 | 3/1971 | Bloom et al. | 285/287 |
| 4,073,512 | 2/1978 | Vian et al. | 285/386 |
| 4,655,658 | 4/1987 | Gulistan | 411/353 |
| 4,877,270 | 10/1989 | Phillips | 285/354 |

OTHER PUBLICATIONS

M. Favier, FR 1,000,956, Feb. 1952, (Figure Only).

Primary Examiner—P. Austin Bradley
Assistant Examiner—Jeffrey T. Knapp
Attorney, Agent, or Firm—Ohlandt, Greeley & Ruggiero

[57] ABSTRACT

A fitting or fitting assembly is provided that comprises a fitting body having an enlarged first end, a nut having a circumferential ridge that has a diameter less than the first end of the fitting body so that the first end prevents the nut from sliding further in one direction, and a ring that is adapted to be assembled onto the exterior surface of the fitting body to prevent the nut from sliding further in a second direction opposite to the first direction. The nut has interior threads that are adapted to receive the external threads of a mated fitting. A method for assembling the fitting comprises the steps of sliding a nut having an internally threaded portion onto a fitting body having an enlarged end that prevents axial movement of the nut in a first direction, and press-fitting a retention ring about the fitting body at a desired position in order to limit the axial movement of the nut in a second direction opposite to the first direction.

21 Claims, 1 Drawing Sheet

CAPTURE RING FITTING

BACKGROUND OF THE INVENTION

I. Field of the Invention

The present invention relates generally to a tube end fitting and, more particularly, to a butt-weld, beam seal type fitting with a retained or captured coupling nut. The preferred fitting or fitting assembly is an improvement over the prior art fittings due to a significant savings in weight and in the improved function of the coupling nut. This improvement is a result of the virtually true concentricity and perpendicularity of the coupling nut versus the compromised geometry inherent in the conventional stake-on wire retained nut. The present fitting provides a nut that is precisely positioned to protect the seal face of the fitting, yet exposes just the minimum amount to permit easy mating with the sealing surface of the mated fitting. The capture ring provides these benefits as well as simplifying the manufacturing procedures required to fabricate the retained nut fitting.

II. Description of the Prior Art

U.S. Pat. No. 2,417,350 to C. L. Conroy entitled Method Of Manufacture Of An Adaptor Union, is directed to an adaptor unit that includes a swivel nut, and a body having an integral spud. The swivel nut includes a flanged end, an internal annular recess and threaded interior portion, while the body includes a conical head and restricted neck. The flanged end of the swivel nut engages the restricted neck of the body. This patent fails to provide a threaded nut having a flange that fits about the outwardly flanged end of a capture ring.

U.S. Pat. No. 2,460,110 to L. M. Stinchcomb, et al. entitled Coupling Means, is directed to a separable hose coupling made of metal. The coupling includes a male half having a rounded tubular nipple and an expanded, externally threaded end, and a female half having a rounded tubular nipple with a flange. An internally threaded nut is mounted on nipple and the nut has an inturned flange adapted to engage the nipple behind the flange. A rib is placed on the female half but spaced from the flange so that the inturned flange is positioned between the rib and the flange. When the female half is forced into the end of a hose, the inturned flange of the nut will move against the rib. When the hose is fully in place, the nut will be loose between the end of the hose and the flange of the nipple. This patent does illustrate, albeit for a hose coupling, movement of a secured threaded nut on a sleeve or tube but for a hose coupling. It does not, however, provide the retention ring structure of the claimed present invention that permits one to adjust, as desired, pullback position of the nut.

U.S. Pat. No. 4,877,270 to E. D. Phillips entitled Connector For Tapered Glass Joints, provides several forms of a joint connection. The joint connection includes a first glass tubing section having a tapered inner end surface and an outer surface with a threaded portion, a second glass tubing section having an outwardly flared end and an outer circumferential groove, a replaceable sleeve having a tapered outer surface adapted to mate with the taper surface, a retaining ring, and a cap having a dependent skirt with internal threads that are adapted to be threaded onto the threads of the outer surface. In use, the ring is slipped over the end of the second tubing section and into the groove. The cap is then moved axially on top of the end of the second tubing section into engagement with the ring, and the sleeve is positioned over the flared end and against the underside of the cap. The first tubing section and the cap are threaded tightly to force the tapered outer surface into sealing engagement with tapered surface. The present fitting assembly does not have the two tubing sections or a separate retaining ring and a skirted cap.

U.S. Pat. No. 4,073,512 to D. R. Vian, et al. entitled Quick connect Device For Auto Radiators, is directed to a device for connecting an auxiliary cooler to an existing automobile. The device includes a hollow tube having flared ends, and an adaptor coupling that includes a bore so that the tube is slidably received therein. The adaptor coupling has a threaded portion and an adjacent hex-sided portion.

U.S. Pat. No. 3,572,775 to J. Bloom, et al. entitled Brazed Fittings is directed to an improved sleeve that is to be joined to metal tubing by brazing or welding.

None of these patents provides the uniquely structured fitting assembly of the present application.

SUMMARY OF THE INVENTION

Against the foregoing background, it is a primary object of the present invention to provide a fitting or fitting assembly in which the nut is captured or secured to the fitting body.

It is another object of the present invention to provide such a fitting that has virtually true concentricity and perpendicularity of the sealing surface to a sealing surface of a mated fitting.

It is still another object of the present invention to provide such a fitting that eliminates axial movement and/or twisting or turning so as to mate to another fitting.

It is still yet another object of the present invention to provide such a fitting that has increased strength and rigidity over known prior art fittings.

It is a further object of the present invention to provide such a fitting that has improved functional performance and at the same time a significant weight savings.

It is still a further object of the present invention to provide such a fitting that provides improved accuracy of the pullback position as compared to prior art fittings.

It is yet a further object of the present invention to provide such a fitting that exposes the sealing surface of the fitting in order to provide ease of mating, while not overexposing the sealing surface so that the sealing surface is protected against damage.

It is still yet a further object of the present invention to provide such a fitting that permits the disassembly of the nut from the fitting without damage to either component.

It is yet still a further object of the present invention to provide such a fitting that eliminates, grooves, stops or similar machining that creates stress riser areas in the fitting.

It is yet still a further object of the present invention to provide such a fitting that can be fabricated with simpler manufacturing procedures than are presently required for the prior art stake-on wire retained nut fitting.

To the accomplishments of the foregoing objects and advantages, the present invention, in brief summary, comprises a fitting assembly that includes a fitting body having an enlarged first end with a sealing surface, a nut having a circumferential ridge positioned radially inward that has a diameter less than that of the first end of the fitting body so that the first end limits sliding or movement of the nut in a first direction, and a ring that is adapted to be positioned as desired on the exterior surface of the fitting body to limit the sliding or movement of the nut in a second direction opposite the first direction. The nut has interior threads that are adapted to receive the external threads of a mated fitting in order to connect together the fitting assembly and the mated fitting.

The present invention further comprises a method for assembling a fitting assembly. The method comprises the steps of: sliding a nut having an internally threaded portion onto a fitting body having an enlarged end that limits axial movement of the nut in a first direction, and press-fitting a capture or retention ring about the fitting body at a desired position in order to limit the axial movement of the nut, as desired, in a second direction opposite to the first direction.

BRIEF DESCRIPTION OF THE DRAWINGS

The foregoing and still other objects and advantages of the present invention will be more apparent from the following detailed explanation of the preferred embodiments of the invention in connection with the accompanying drawings wherein.

BRIEF DESCRIPTION OF THE PREFERRED EMBODIMENTS

Figure 1:
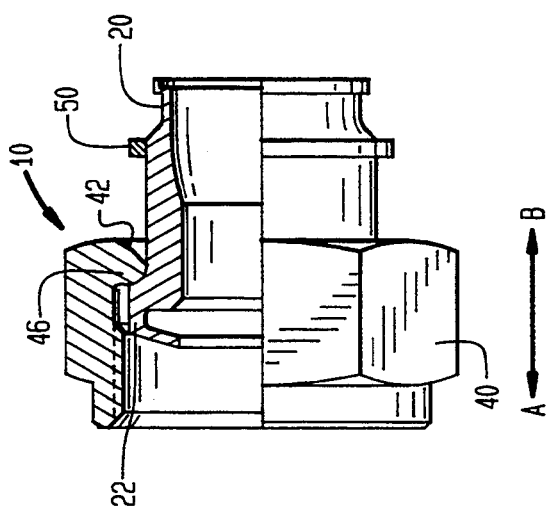
FIG. 1 is a side elevation view, partially in section, of an assembled fitting of the present invention.

Referring to the drawings and, in particular, to FIG. 1, there is provided a fitting or fitting assembly of the present invention generally represented by reference numeral 10. The fitting assembly 10 includes a fitting body or shoulder 20, a nut 40 adapted to be secured about the outer periphery of the fitting body, and a ring or retention ring 50 adapted to be press fit about the fitting body.

Figure 3:
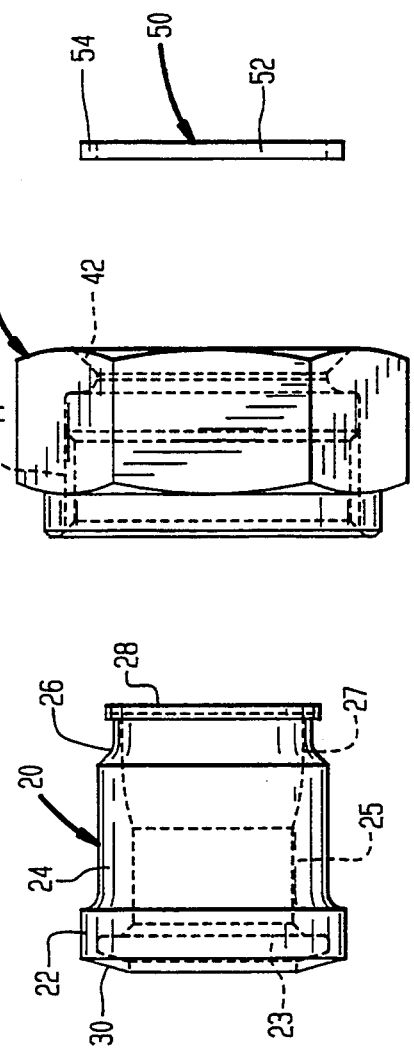
FIG. 3 is an exploded view of the fitting of FIG. 1 in its disassembled condition.

As shown in FIGS. 1 and 3, the fitting body or shoulder 20 is a hollow, elongated body of basically cylindrical shape. At one end of the shoulder 20, there is a first end having a raised perimeter or circumferential end portion 22 that includes a seal or sealing face or surface 30 of the fitting. The outer surface of the shoulder 20 flows from the end portion 22, downward to a center portion 24 having a relatively uniform circumferential extant and then arcuately reduces 26 culminating in a second end 28. The second end is adapted to be fixedly connected to a component (not shown) by conventional means, such as, for example welding or brazing.

The interior of the shoulder 20 includes an enlarged circumferential area 23 that is positioned within the end portion 22. The interior also includes a uniformly cylindrical portion 25 and a larger, basically uniformly cylindrical portion 27 that terminates at the second end 28.

The end portion 22 of the shoulder 20 includes an angled surface or face that is the sealing face 30 of the fitting assembly 10.

The free edge of the sealing face 30 is adapted to seal with a mated fitting (not shown) that is adapted to fit into a hollow portion 42 of the nut 40 and tightly engage internal threads 44 of the nut. Accordingly, the fitting assembly 10 acts to connect the mated fitting to the component.

Figure 2:
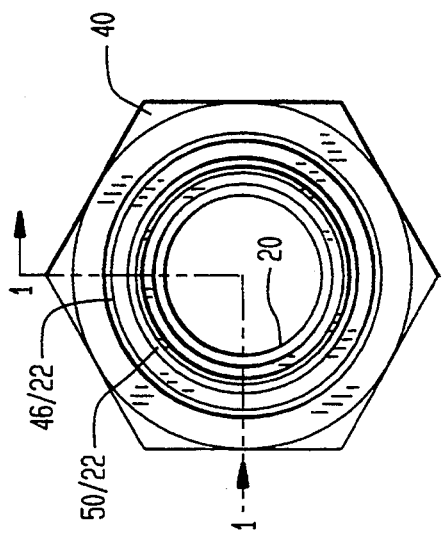
FIG. 2 is along lines 1—1 an end view of the fitting of FIG. 1.

As shown in FIGS. 1 through 3, the end portion 22 acts as an outer rim stop of the nut 40. The end portion 22 can even be a load bearing rim.

The shoulder or fitting body 20 is made of any rigid, high strength material including, preferably, stainless steel, titanium or nickel or one or more alloys thereof. In the most preferred embodiment, the shoulder 20 is made of titanium.

The nut 40 has a hollow interior that includes the internal threads 44 through a portion thereof and a reduced circumferential end or radially inward ridge 46. The reduced circumferential end 46 is sized so as to fit about the exterior of the shoulder 20 and slide thereon. However, the end portion 22 of the shoulder 20 has an external circumference that is sized larger than the circumferential end 46 of the nut 40. Thus, the end portion 22 acts as an outer rim stop to prevent or limit the end 46 and, therefore, the nut 40 from sliding further on the shoulder 20 in the axial direction shown by arrow A.

The threads 44 of the nut 40 preferably extend about one-half of the axial extant. The threads 44 are adapted to engage with the external threads of the mated fitting inserted into the nut 40 to secure and align the mated fitting to the fitting assembly 10.

The nut 40, as the shoulder 20, is made of rigid, high strength material and, preferably, is made of stainless steel, titanium or nickel or one or more alloys thereof. In the most preferred embodiment, the nut 40 is made of titanium.

The ring 50 is a retention ring. The ring 50 is press fit onto the shoulder 20 of the fitting assembly 10. In the preferred embodiment shown in the figures, the ring 50 has a hollow interior 52 and is sized so as to press fit on the exterior surface of the shoulder 20 at any desired position along the center portion 24. A tool fixture is used to press fit the ring 50 onto the shoulder 20. The retention ring 50 is sized so that it can just fit about the shoulder 20 and yet not slide on the shoulder. It has been found that a force of at least sixty-five (65) pounds can be resisted by the ring 50 without any measurable movement.

The ring 50 has a height or radial extant 54 such that the circumferential end 46 of the nut 40 is stopped by the ring. In particular, as is evident in FIGS. 1 and 3, the circumferential end 46 of the nut 40 has a chamfered shoulder 42 that contacts ring 50. Thus, the ring 50 acts as a second stop for the nut 40, but in a second, axial direction shown by arrow B in FIG. 1.

The tool fixture acts to locate or dictate the position of the ring 50 and, therefore, the position of the nut 40 with respect to the shoulder 20. In other words, the nut 40, and in particular its shoulder, abuts the ring 50 and the position of the ring is a function of the tool fixture so that the ring's position automatically compensates for normal variations in the dimensions of the individual nut, shoulder and ring used in any given fitting assembly. Thus, the ring 50 serves as a self adjusting mechanism for any given fitting assembly.

The retention ring 50 is, preferably, made of the same material as the shoulder 20 to eliminate possible differences in thermal expansion. Accordingly, the ring 50 is, preferably, made of stainless steel, titanium or nickel or one or more alloys thereof and, in the most preferred embodiment, it is made of titanium just like the shoulder 20.

The retention ring 50 can be placed at any position on the center portion 24 of the shoulder 20. In the most preferred embodiment, the ring 50 is press fit such that the nut can slide within +/−0.005 inches of the optimum pullback position. As used in the present application, optimum pullback position means the nut 40 is moved in the second axial direction as little as possible while still permitting the sealing face 30 to be protected by the nut.

The ability of the nut to slide within +/−0.005 inches of the optimum pullback position, as compared to the industry standard of +/−0.031, is significant since it results in the elimination of component tolerance stack-up. Also, this improved accuracy of the optimum pullback position provides for ease of assembly of the fitting to a mated fitting while providing a maximum degree of physical protection to the sealing surface during handling and assembly operations. Specifically, it permits the sealing surface of the mated fitting to easily mate with the sealing surface 30 of the present fitting assembly 10, while it surrounds the sealing surface of the fitting assembly just enough to prevent damage to the sealing surface during normal handling prior to and during assembly and connection to the mated fitting. This is achieved without any increase in the cost of the fitting assembly.

The present fitting assembly 10 also provides virtually true concentricity and perpendicularity of the sealing surface 30 to the sealing surface of a received mated fitting. Accordingly, a better seal is provided between the sealing surface of the mated fitting and the sealing surface 30 of the shoulder 20, than from conventional retained nut fittings, namely a stake-on wire retained nut fitting.

The fitting assembly 10 also has increased strength and rigidity over known prior art fittings thereby providing an additional benefit over the prior art fittings. Moreover, the fitting assembly 10 is lighter in weight and it is calculated to be approximately eleven percent lighter than known prior art fittings. The weight savings alone translates into significant cost savings, especially to aircraft operators, over the prior art fittings. It should be understood that for certain industries, such as the airline and the military industries, a savings in weight translates into a savings in pay-load and thereby depending on the number of trips the aircraft makes, translates into significantly greater cost savings than gleaned by the cost savings in materials for the fitting. For example, it is believed that a savings of one pound in weight for a fitting used in a commercial aircraft translates to a savings of as much as $1,000 per life time of each aircraft due to the savings in pay-load and fuel savings.

The following chart compares the weight of different sized fitting assemblies of the present invention to the prior art, stake-on wire fittings when both fittings are made of titanium.

| SIZE | WEIGHT PRESENT INVENTION | WEIGHT PRIOR ART | SAVINGS |
| --- | --- | --- | --- |
| 04 | .014 LBS | .016 LBS | 12.5% |
| 06 | .020 LBS | .024 LBS | 16.7% |
| 08 | .033 LBS | .036 LBS | 8.3% |
| 10 | .046 LBS | .052 LBS | 11.5% |
| 12 | .060 LBS | .066 LBS | 9.1% |
| 14 | .095 LBS | .106 LBS | 10.4% |
| 16 | .118 LBS | .132 LBS | 10.6% |
| 2120 | .191 LBS | .213 LBS | 10.3% |

The above chart illustrates that the present fitting provides an average weight savings of about 11.2 percent over the prior art fittings, namely stake-on wire fittings.

Another significant benefit of the present fitting assembly 10 is that with the proper tooling, the nut 50 can be disassembled without damage to the mated fitting or the shoulder 20 or the nut 40.

As mentioned above, the fitting assembly 10 eliminates, grooves, stops or similar machining within the elongated shoulder 20 of the fitting. Such features create stress riser areas in the fitting and thereby reduce the fatigue life capability of the fitting.

The present fitting assembly 10 can be assembled by positioning the fitting body 30 for receipt of the nut 40. The nut 40 slides over the second end 26 of the fitting body or shoulder 20 with the threaded portion 44 first and the circumferential end 46 thereafter. The nut 40 can slide on the shoulder 20 until the circumferential end 46 meets the end portion 22 of the shoulder. The end portion 22 stops the nut 40 from sliding any further in the direction of arrow A in FIG. 1. The retention ring 50 is then press fit onto the shoulder 20 at any desired position along the center portion 24 thereof. Once the ring 50 is in place, the ring stops the axial movement of the nut 40 in a second direction, opposite to the first direction, shown by arrow B in FIG. 1. Thus, the retention ring 50 establishes how close the nut can reach the optimum pullback position. By preparing a fixture that positions the nut relative to the sealing face in the most optimum pullback relationship, the ring 50 can then be pressed onto the shoulder 20 until contact with the nut occurs. In this way, the dimensions of the fixture will be translated into each subsequent fitting assembly regardless of the variations or dimensional deviations in the nut, shoulder or ring.

An additional benefit of the present fitting assembly is that it is simpler to manufacture than prior art fittings, such as a stake-on wire retained nut fitting. Specifically, the wire and the aperture in the nut and the groove in the fitting all have to fabricated and with the wire fabricated to controlled dimensions. Also, the wire is assembled around the nut thereby adversely effecting the geometry of the nut. Further, the nut is weaker due, in part, to the aperture in the nut. Still further, the nut must be longer to accommodate the wire thereby increasing the weight and cost of the nut. Thus, the present fitting assembly avoids these problems and deleterious characteristics of the known stake-on wire, retained nut fitting.

Having thus described the invention with particular references to the preferred forms thereof, it will be obvious that various changes and modifications may be made therein without departing from the spirit and scope of the invention as defined by the appended claims.

Wherefore, I claim:

1. A fitting comprising:
   a fitting body having a center portion with an exterior surface that is free of external grooves and stops and having an enlarged first end;
   a nut positioned on the center portion of the fitting body, the nut having a circumferential ridge that has a diameter less than that of the first end of the fitting body so that the first end limits sliding of the nut in a first direction, the nut having interior threads that are adapted to receive the external threads of a mated fitting; and a ring, that is press fitted on the center portion of the fitting body, and is adapted to be positioned at any location on the center portion of the fitting body to limit the movement of the nut in a second direction opposite to the first direction.

2. The fitting according to claim 1, wherein the ring is press fit into a position on the fitting body such that the nut can slide back within +/−0.005 inches of an optimum pullback position regardless of the dimensions of the nut and the ring.

3. The fitting according to claim 1, wherein the ring is press fit into a position on the fitting body such that the nut can slide back within +/−0.005 inches of the optimum pullback position to eliminate component tolerance stack-up.

4. The fitting according to claim 1, wherein the fitting body has a sealing surface, and wherein the nut permits a sealing surface of a mating fitting to easily mate with the sealing surface of the fitting yet provides a maximum degree of physical protection to the sealing surface of the fitting during handling and assembly operations.

5. The fitting according to claim 1, wherein the fitting body has a sealing surface, and wherein the nut as positioned on the fitting body and retained thereon by the ring provides true concentricity and perpendicularity of the sealing surface with a sealing surface of a mated fitting to thereby provide direct assembly to the mated fitting.

6. The fitting according to claim 1, wherein the fitting body is made of a rigid, high strength material.

7. The fitting according to claim 1, wherein the ring is made of the same material as the fitting body to eliminate possible differences in thermal expansion.

8. The fitting according to claim 1, wherein the ring is made of a material selected from the group consisting of stainless steel, titanium, nickel, and one or more alloys of nickel or titanium.

9. The fitting according to claim 1, wherein the ring is made of titanium.

10. The fitting according to claim 1, wherein the fitting body is made of a material selected from the group consisting of stainless steel, titanium, nickel, and one or more alloys of nickel or titanium.

11. The fitting according to claim 10, wherein the fitting body is made of titanium.

12. The fitting according to claim 1, wherein the nut is made of a material selected from the group consisting of stainless steel, titanium, nickel, and one or more alloys of nickel or titanium.

13. The fitting according to claim 12, wherein the nut is made of titanium.

14. The fitting according to claim 1, wherein the ring is sized so that it can just fit about the fitting body and yet not slide on the fitting body.

15. The fitting according to claim 14, wherein the ring can resist a force of at least sixty-five pounds without any measurable movement.

16. The fitting according to claim 1, wherein the circumferential ridge of the nut includes a chamfered edge.

17. The fitting according to claim 16, wherein the chamfered edge of the nut abuts the ring to limit the movement of the nut in the second direction.

18. A fitting for connecting together a component to external threads of a mated fitting, the fitting comprising:

a fitting body having a center portion with an exterior surface that is free of external grooves and stops and having an enlarged first end and a second end, the first end including a sealing surface, the second end being adapted to be secured to the component;

a nut positioned on the center portion of the fitting body, the nut having a circumferential ridge that has a diameter less than that of the first end of the fitting body so that the first end limits sliding of the nut in a first axial direction, the nut having interior threads that are adapted to receive the external threads of the mated fitting; and a ring, that is press fitted on the center portion of the fitting body, and is adapted to be positioned at any location on the center portion of the fitting body to limit the movement of the nut in a second axial direction opposite to the first axial direction.

19. The fitting according to claim 18, wherein the second axial position is +/−0.005 inches of an optimum pullback position of the nut.

20. A method for assembling a fitting in which a ring is secured by press-fit on the fitting, the method comprises the steps of:

sliding a nut having an internally threaded portion on a center portion of a fitting body with the center portion having an exterior surface that is free of external grooves and stops, wherein the fitting body has an enlarged end that limits the movement of the nut in a first direction, and press-fitting the ring about the exterior surface of the center portion of the fitting body at a desired position on the fitting body to limit the movement of the nut in a second direction opposite to the first direction, wherein the ring can withstand a force of at least sixty-five pounds, yet can be removed from the fitting body without damage to the fitting body and the ring.

21. The method according to claim 20, further comprising the initial step of positioning the fitting body on a component.

* * * * *